United States Patent [19]

Jenkins

[11] 4,038,182

[45] July 26, 1977

[54] OIL SPILL RECOVERY METHOD AND APPARATUS

[76] Inventor: Richard Stuart Jenkins, 5821 Dolores, Houston, Tex. 77027

[21] Appl. No.: 647,505

[22] Filed: Jan. 8, 1976

Related U.S. Application Data

[63] Continuation of Ser. No. 439,219, Feb. 4, 1974, abandoned.

[51] Int. Cl.$^2$ ............................................. E02B 15/04
[52] U.S. Cl. .............................. 210/23 R; 210/242 S; 210/DIG. 25
[58] Field of Search ....... 210/242 S, 221 R, DIG. 21, 210/DIG. 25, 23 R

[56] References Cited

U.S. PATENT DOCUMENTS

| 3,703,463 | 11/1972 | Bhuta et al. | 210/242 S X |
| 3,800,951 | 4/1974 | Mourlon et al. | 210/242 S |

Primary Examiner—Frank A. Spear, Jr.
Attorney, Agent, or Firm—Pravel, Wilson & Gambrell

[57] ABSTRACT

A method and apparatus for recovering an immiscible oily substance spread as an oily film over the surface of a body of water by forming a vortex in the water mass to attract the oily film substance and water in the vicinity of the vortex to flow into the vortex and flowing the attracted oily film substance and water from the vortex to a quiescent zone to enable separation of the oily film substance and water. The separated oily film substance is retained in a receiver and recovered from the receiver as desired.

25 Claims, 5 Drawing Figures

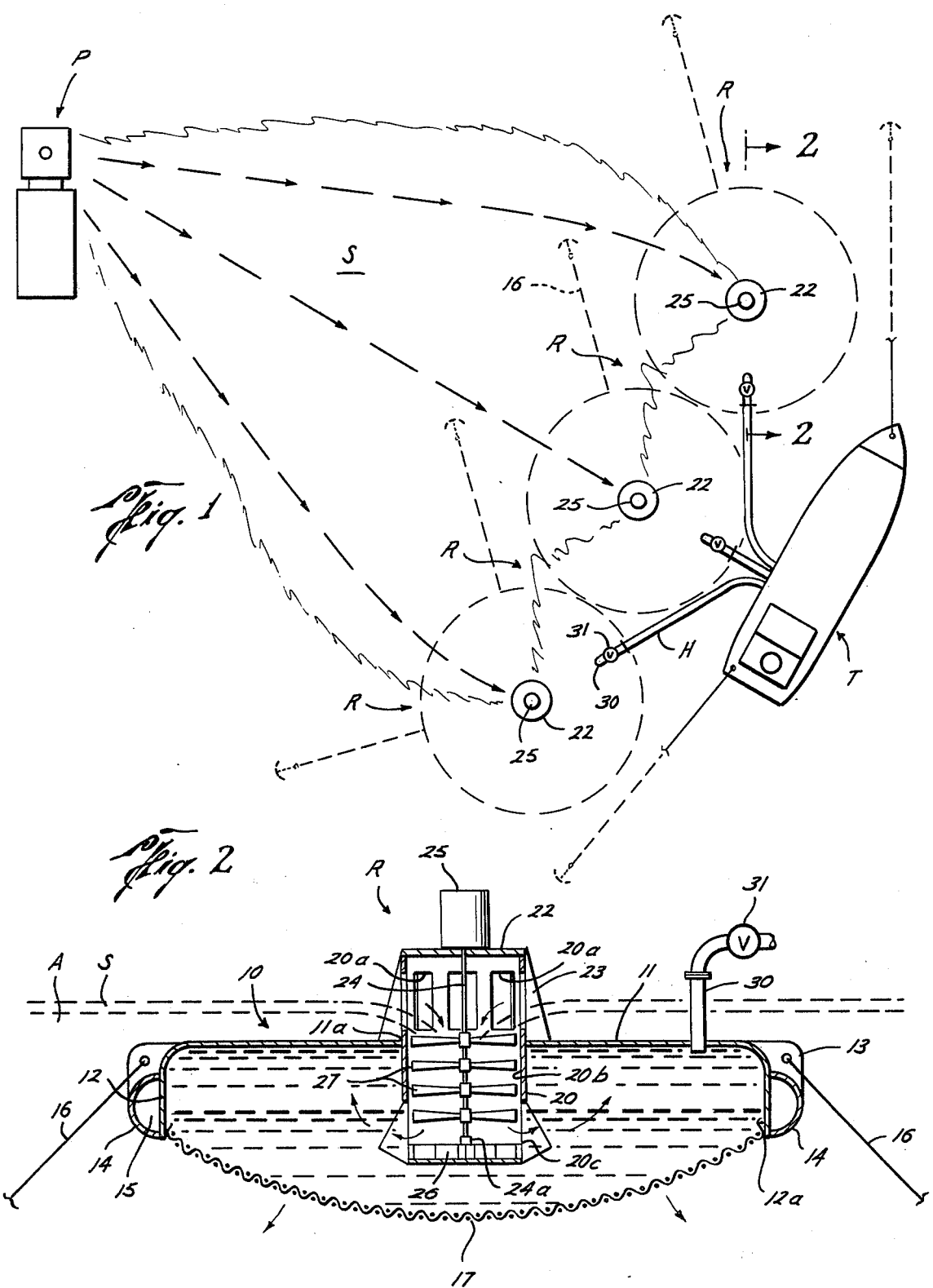

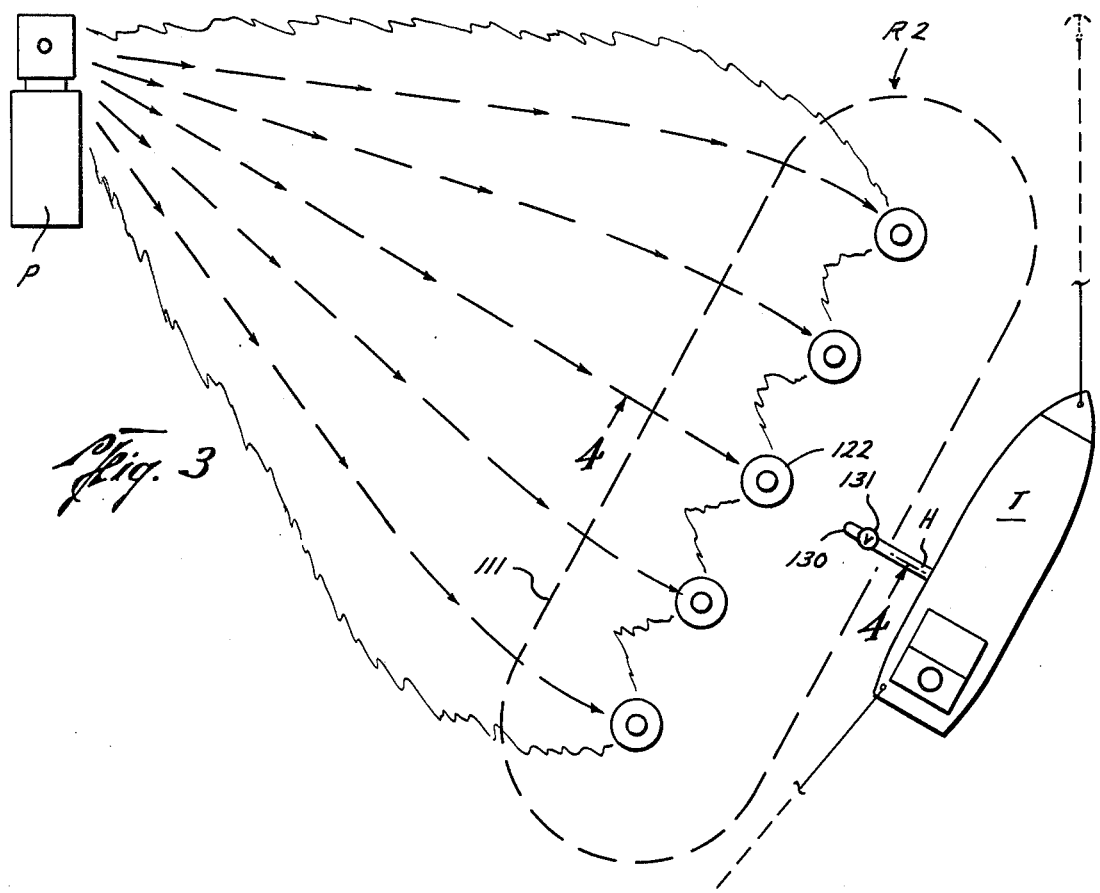
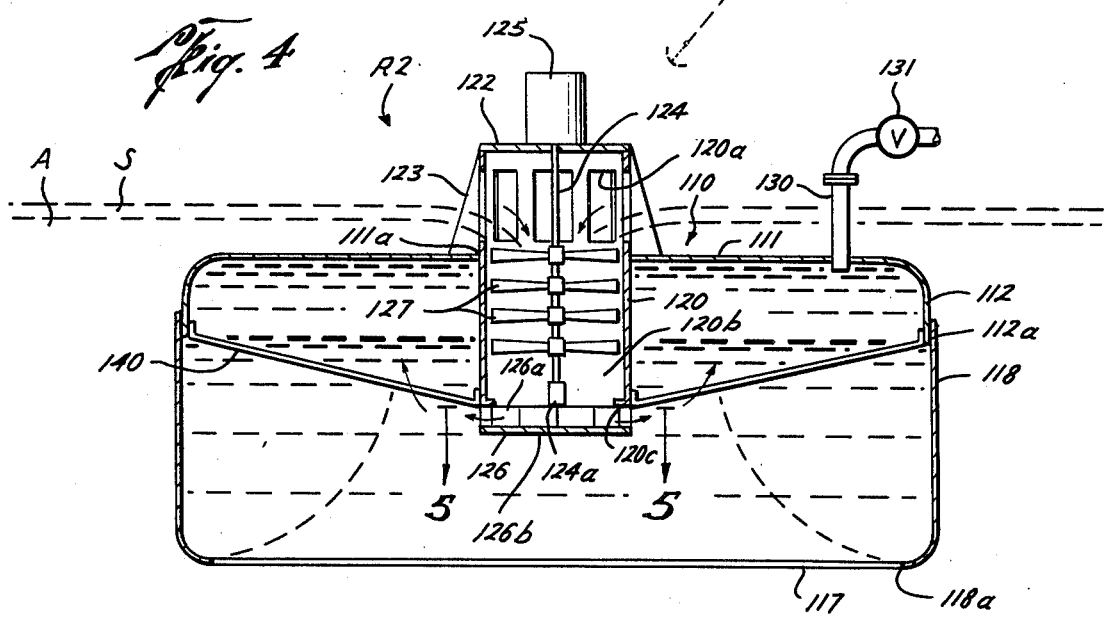
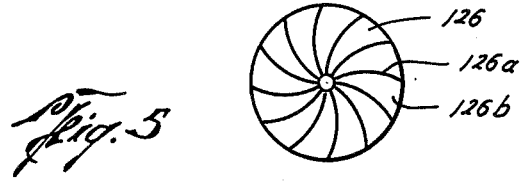

OIL SPILL RECOVERY METHOD AND APPARATUS

This is a continuation of application Ser. No. 439,219, filed 2/4/74, now abandoned.

BACKGROUND OF THE INVENTION

1. Field of the Invention

This invention relates to a method and apparatus for recovering an immiscible liquid spread as a thin film over the surface of a body of water. More particularly, this invention relates to a method and apparatus for recovering oil resulting from oil spills.

2. Description of the Prior Art

Serious problems have resulted from water pollution caused by accidental spills or leakage of petroleum or other liquids into a body of water with the resulting formation of a thin oily film, or "slick" over the surface of the body of water. Such oily films or slicks have been dangerous to marine life and wildlife and have made our rivers, bays and oceans aesthetically undesirable. Previous methods of combatting such accidental spills have been generally ineffective. For example, some devices involve skimming the body of water to remove the oily layer by employing blades, belts, absorbant rollers, etc. These methods generally suffer from several disadvantages, among which are low rates of recovery and inability to operate effectively in waters with significant wave action. Generally, these types of recovery devices have been moved about in the water to contact the oil film to effect recovery or have been employed with additional devices to bring the oily film to the recovery apparatus.

Prior art apparatus for attracting the oily film to the recovery device generally have been ineffective because of the limited volume of oil film substance and water which can be efficiently recovered or handled. For example, in U.S. Pat. No. 3,635,342, there is disclosed an apparatus employing vortex action to cause the oily film substance, or slick, to flow toward and into the vortex forming a cavity filled with the oily film substance which is thereafter recovered. This has generally been ineffective as the volume of material which can be handled is severely limited and the vortex disclosed therein is affected by wave action.

An object of the present invention is to provide a new and improved method and apparatus for oil spill recovery.

It is a further object of this invention to provide a new and improved apparatus for oil spill recovery.

It is a further object of the present invention to provide a new and improved method for oil spill recovery.

SUMMARY OF THE INVENTION

A method and apparatus for oil spill recovery by forming a vortex in a water mass to attract the oily film substance disposed on the surface thereof to flow into the vortex, flowing the attracted oily film substance and water from the vortex to a quiescent zone to enable the oily film substance and water to separate with the oil being retained in a receiver and recovering the retained, separated oily film substance from the receiver.

BRIEF DESCRIPTION OF THE DRAWINGS

FIG. 1 is a top view illustrating a plurality of the oil recovery devices operably deployed with an attendant recovery ship;

FIG. 2 is a side view, in section, taken along line 2—2 of FIG. 1;

FIG. 3 is a plan view illustrating another embodiment of the oil recovery device of the present invention;

FIG. 4 is a side view, in section, taken along line 4—4 of FIG. 3; and

FIG. 5 is a view along line 5—5 of FIG. 4.

DESCRIPTION OF THE PREFERRED EMBODIMENTS

In FIG. 1 there is illustrated the general manner in which the oil recovery apparatus of the present invention is preferably deployed in recovering an oily film substance disposed on the surface of a water mass. A plurality of oil recovery apparatus or devices, generally designated as R, are deployed in the vicinity of a lighter density oily film substance or oil slick S disposed or floating on the surface of a heavier density body or mass of water W, such as river, lake, sea, gulf or ocean, to effect recovery of the oil S. While the oil slick S is illustrated as emanating from an offshore drilling or production platform P, it should clearly be understood that any floating oily film substance or oil slick S emanating from any source may be recovered by oil recovery device R of the present invention. The oil recovery devices R are preferably positioned such that the oily film substance or oil slick S tends to flow toward and be attracted into a vortex formed by the recovery device R in the water W. As illustrated in FIG. 1, the oil recovery devices R may be connected to any suitable additional storage capacity, such as an attendant tanker T, by suitable hose or other connecting means H connected to the oil recovery device R to enable removal of the recovered oil from the device R as desired. It will be understood, however, that the oil recovery device R of the instant invention provides some storage capacity and may be employed independently of any attendant tanker T and the recovered oil may be removed from the device R intermittently as desired.

As illustrated in FIG. 2, the oil recovery device R is generally positioned in the body of water W adjacent the surface A thereof. The oil recovery device R includes a base or body, generally designated 10, forming a portion of a receiver means for purpose that will become more readily apparent hereinafter. The body 10 preferably includes a substantially flat circular plate 11 of approximately 200 feet in diameter disposed below the surface A of the water W at the desired depth. Located adjacent the outer periphery or circumference of the plate 11 is a downwardly extending circular skirt or wall forming member 12 which may be formed integral with the plate 11 and which cooperates with the plate 11 to form an inverted tank which serves as a receiver means for the recovered oil S. Secured to the body 10 adjacent the skirt 12 and preferably equally circumferentially spaced about the skirt 12 are a number of anchor or mooring connections 13 for positioning the device R in desired relationship with the oil slick S in the well-known manner. The skirt 12 also cooperates with an annular member 14 having a semicircular cross-section to form an enclosed annular chamber or tank 15 for providing a ballast or buoyancy means for cooperating with the mooring cables 16 attached to the anchor connections 13 to establish and hold a preselected desired distance between the plate 11 and the water surface A by admitting or removing water W from the buoyancy chamber 15. The admission and exhausting of the water W from the ballast chamber 15 may be effected by either manual or automatic valving control systems (not illustrated) as is well-known in the art.

Secured about a lower edge 12a of the skirt 12 is a screen or other semi-permeable membrane 17 for enabling the flow of water W therethrough while dampening the effect of any water currents or flow to provide a quiescent zone in the water W substantially and generally defined as bounded below the upper plate 11, inside the skirt 12 and above the screen 17. The screen 17 is preferably employed with apparatus of the present invention, but it should be understood that the recovery device R will operate in the absence of the screen 17 as the screen is not essential to the formation of the quiescent zone.

The body 10 further includes tubular flow conductor member 20 mounted with a concentric opening 11a through the plate 11 to form a flow passage through the plate 11. The tubular member 20 is provided with a plurality of equally circumferentially spaced openings 20a to enable the flow of water W and oil S into a bore 20b of the tubular member 20, but it should be understood that tubular member 20 may extend only downwardly from the plate 11. Preferably, the tubular member 20 extends upwardly past the water surface A to provide a support platform 22 above the surface A of the water W, but the support platform 22 may be supported independently of the member 20. Additional bracing 23 may be provided as desired for the support plate 22 without interfering with the flow path of the oil slick S and water W through the openings 20a of the tubular member 20.

Rotatably mounted with the support plate 22 and extending downwardly through the bore 20b of the tubular member 20 is a rotating shaft means 24. Additional radial support bearings (not illustrated) for the shaft 24 may be provided in the bore 20b of the tubular member 20 as is well-known to those skilled in the art. Mounted on the platform 22 and operably connected with the shaft 24 is a means, designated at 25, for effecting rotation of the shaft 24 when desired. Suitable means 25 for effecting rotation may include an internal combustion engine connected through a gear means system with the shaft 24 or an electrical generator system electrically connected with an electrical motor mechanically connected to the shaft 24 for effecting the desired rotation. Numerous other means 25 for rotating the shaft 24 will be readily apparent to those skilled in the art. It should also be understood that it is within the scope of the present invention that the means 25 for rotating the shaft 24 may be located partially or completely below the surface A of the water W, but location on the support platform 22 is preferred.

Mounted on the lower end 24a of the rotatable shaft 24 and below the lower annular edge 20c of the tubular flow conductor 20 is an impeller 26 for directing or flowing fluid in the bore 20b of the tubular member 20 radially outwardly into the quiescent zone when the shaft 24 is rotated. Also arranged on the rotatable shaft 24 above the impeller 26 is a plurality of paddles or propellers for imparting the mechanical energy of the rotating shaft 24 to the water W for forming a vortex adjacent the surface A to attract the oil slick S and water W when the shaft 24 is rotated. The paddles 27 may also serve to effect downwardly flow through the bore 20b of the tubular member 20 when the shaft 24 is rotated.

The attracted oil spill S and water W flowing into and through the bore 20b is expelled radially by the impeller 26 into the zone or area below the plate 11 and inside the skirt 12 forming a generally annular-shaped quiescent zone. The lighter density attracted oil spill S to separate from the water W and flow upwardly by the effect of gravity as is well-known in the art. As the attracted oil spill S separates out and tends to flow upwardly in the water mass W, it is retained or captured in the adjacent receiver means formed by the plate 11 and the skirt 12. The attracted water W, on the other hand, tends to be displaced from the captured oil spill S and flows outwardly from the quiescent zone through the permeable screen 17. Thus, the oil recovery device R of the present invention inherently has the capability to attract and recover relatively large amounts of spilled oil S while enabling the large quantity of attracted water W to flow freely from the quiescent zone without wasting or utilizing storage capacity of the recovered oil S by storing unseparated water W.

A suitable pump-out connection 30 having a valve means indicated at 31 is provided to enable removal of the recovered oil S from the recovery device R as will be apparent to those skilled in the art. Due to the additional buoyancy imparted to the recovery device R by increased amounts or volume of recovered oil S, it is desirable that the buoyancy chamber 15 be controlled to compensate for the increased buoyancy of the recovery device R as the spill oil S is recovered. These controls should be arranged to continually position the openings 20a such that the vortex formed by the paddles 27 are relatively insensitive to wave action. This, coupled with the plate 11 and skirt 12 which attempt to dampen the effect of waves flowing by the recovery device R, provide an oil spill recovery device R relatively insensitive to wave action.

As illustrated in FIG. 3, a second embodiment of an oil recovery device of the present invention, designated as R2, is shown deployed in the vicinity of an oil slick S emanating from an offshore drilling platform P. In this embodiment, identical reference characters increased by a factor of 100 are used to reference the identical elements of the first embodiment. The oil recovery device R2 includes an elongated base plate 111 having arranged thereon a plurality of vortex-inducing means as will become apparent hereinafter. The oil recovery device R2 is also preferably positioned transverse to the oil slick S such that the oil slick S tends to flow toward and to be attracted into the vortices formed by the recovery device R2 in the water W.

As illustrated in FIG. 4, the elongated base plate 111 is disposed below the surface of the water W at the desired depth by buoyancy means (not shown) and having located at the outer periphery the downwardly extending skirt 112. Secured about the lower edge 112a of the skirt 112 is a downwardly extending movable extension or wall-forming member 118 for increasing the volume of storage capacity of the oil recovery device R2. The extension 118 is connected and sealed to the lower edge 112a of skirt 112 in a manner to enable it to be folded inwardly (illustrated in phantom) when not in use as, for example, when the oil recovery device R2 is being transported to the site of an oil spill S to effect recovery thereof. Suitable additional bracing 140 may be provided from the flow conductor 120 for the downwardly extending skirt 112 and to which the extension 118 may be secured when in the folded position. By use of a flexible extension 118, such as a heavy plastic film and having rigid support members pivotally attached to the skirt 112, the extension 118 may be moved by a cable arrangement to and from the upper or transporting position and the lower or operating position as desired.

The body 110 further includes a plurality of tubular flow conductor members 120 arranged with openings 111a through plate 111 to form the vortex flow passages through the plate 111. The pattern or arrangement of the vortex flow passages on the plate 111 may be either an irregular layout or a regularly spaced layout as illustrated in FIG. 3.

A preferred embodiment of the impeller 126 is illustrated in FIG. 5 showing a top view of impeller 126 with the helically arranged vanes 126a for imparting the radial flow direction extending upwardly from the circular base 126b. It will be understood, however, that it is within the scope of this invention to employ impellers of other designs to effect the moving of the fluid in bore 120b of the tubular member 120 radially outward into the quiescent zone when shaft 124 is rotated.

Arranged on the rotatable shaft 124 above the impeller 126 is a plurality of paddles 127 for imparting the mechanical energy of the rotating shaft 124 to the water W for forming a vortex to attract the oil slick S and water adjacent the surface A when the shaft 124 is rotated. The paddles 127 may also serve to effect flow downwardly through the bore 120b of the tubular members 120 when the shafts 124 are rotated.

In operation, the oil recovery devices of the instant invention are moved to position in a water mass W at a desired location relative to an oil slick S and anchored. The oil recovery devices R are then positioned at a suitable depth in the water mass W by the operation of the buoyancy chamber 15. Power means 25 is then activated for rotating shaft 24, impeller 26 and propellers 27 for forming a vortex adjacent the surface A of the water W. The oil slick S and water W adjacent surface A are attracted toward and are caused to flow into the vortex and through the bore 20b. The rotating impeller 26 flows the oil slick S and water W radially from the bore 20b into the substantially quiescent or calm zone below the plate 11 and inside skirt 12. In the quiescent zone, the lighter attracted oil S tends to separate from the water W and flows upwardly by the effects of gravity where it is retained or captured in the adjacent receiver formed by plate 11 and skirt 12. The separated water W again tends to be displaced downwardly by the captured oil spill S and flows outwardly from the quiescent zone into the surrounding water mass W.

All recovery devices made in accordance with the present invention can be made with processing rates from as low as 100 gallons per minute to very large flow rates of 10,000 gallons per minute and higher. Thus, it is within the scope of the present invention to meet the needs of extremely small marinas and rivers and be available in the massive sizes required for offshore oil spills.

While presently preferred embodiments of the invention have been illustrated and described, it will be understood that the invention may be otherwise variously embodied and practiced in the scope of the claims which follow.

I claim:

1. A method for recovering an immiscible oil substance spread as in oil film over the surface of a water mass, comprising the steps of:
   forming a vortex adjacent the surface of the water mass having an oily film substance disposed on the surface of the water mass with a tubular flow conductor means for attracting both the oily film substance and water in the vicinity of the vortex to flow into the tubular flow conductor means;
   flowing all the attracted water and oil film substance radially outward from the tubular flow conductor means into a quiescent zone formed by a receiver means located below the surface of the water mass and adjacent the bottom of and surrounding the tubular flow conductor means;
   separating the oily film substance and water in the quiescent zone formed by the receiver means by allowing the oily film substance to accumulate in the uppermost portion of the receiver means;
   recovering the separated oily film substance from the quiescent zone of the receiver means as desired; and
   returning the separated water from the quiescent zone of the receiver means to the water mass as desired.

2. The method according to claim 1 wherein the step of forming a vortex includes the step of:
   imparting a circular movement to the water mass to form the vortex.

3. The method according to claim 2 wherein the step of imparting circular movement of the water mass includes the step of:
   transmitting mechanical energy to the water mass about the axis of the vortex.

4. The method according to claim 2 wherein the step of imparting circular movement to the water mass includes the step of:
   injecting a high energy fluid tangentially of the vortex.

5. The method according to claim 1 wherein the step of flowing includes the step of:
   moving the attracted oily film substance and water to a location below the surface of the water mass.

6. The method according to claim 1 wherein the step of flowing further includes the step of:
   discharging the oily film substance and water radially outwardly from the vortex.

7. The method according to claim 1 wherein the step of separating includes the step of:
   returning the water to the water mass below the surface of the water mass.

8. The method according to claim 7 wherein the returning water is passed through a semipermeable membrane to recover entrained oil.

9. The method according to claim 1, wherein the step of flowing includes the step of:
   flowing the attracted water and oily film substance to a quiescent zone of a receiver means in direct communication with the water mass.

10. The method according to claim 1 wherein the step of flowing comprises:
    flowing the oily film substance and water into a quiescent zone surrounding the vortex formed adjacent the surface of the water mass.

11. An apparatus for recovering an immiscible oily substance spread as an oily film over the surface of the water mass, comprising:
    receiver means positioned at a desired subsurface location in the water mass forming a quiescent zone in the water mass located below the surface of the water mass;
    tubular flow conductor means mounted with said receiver means for forming a vortex in the water mass adjacent the surface of the water mass above the receiver means to attract both the surrounding oily film substance and water to the vortex and the tubular flow conductor means; and means mounted with said tubular flow conductor means for flowing all the attracted oily film substance and water radially outward from the tubular flow conductor means to the quiescent zone formed by said receiver means to enable separation of the attracted oily film substance and water in the quiescent zone, said receiver means surrounding the tubular flow conductor means and formed for recovering the oily film substance flowing from its quiescent zone and returning the attracted water to the water mass wherein the oily film substance is recovered.

12. An apparatus according to claim 11, wherein the tubular flow conductor means comprises:

means for imparting a circular movement of the water mass to form the vortex.

13. An apparatus according to claim 12 wherein the means for imparting circular movement to the water mass comprises:

means for transmitting mechanical energy to the water mass for forming the vortex.

14. An apparatus according to claim 11 wherein the means for transmitting mechanical energy to the water mass comprises:

paddle means arranged along a rotatable shaft for transmitting mechanical energy to the water, as the shaft rotates in a desired manner.

15. An apparatus according to claim 11, wherein the means for flowing comprises:

means for moving the attracted oily film substance and water substantially radially from the tubular flow conductor means.

16. An apparatus according to claim 15, wherein the means for moving comprises:

impeller means disposed on a rotatable shaft carried by said tubular flow conductor means and operably disposed in communication with the vortex to move the attracted oily film substance and water substantially radially from the tubular flow conductor means.

17. An apparatus according to claim 11 comprising:

a semi-permeable membrane means mounted with said receiver means for coacting with said receiver means to substantially enclose the quiescent zone wherein entrained oil is recovered from the water returning to the water mass from the bottom of the receiver.

18. An apparatus according to claim 11 comprising:

means mounted with said receiver means for recovering the separated oily film substance from said receiver means.

19. An apparatus according to claim 11 comprising:

means with said receiver means for positioning said receiver means at a desired depth in the water mass.

20. An apparatus according to claim 11 wherein:

said receiver means is movably mounted with a floatable support for positioning said receiver means a desired depth in the water mass.

21. An apparatus according to claim 11, wherein said tubular flow conductor means includes:

paddle means arranged along a rotatable shaft carried by said tubular flow conductor means for transmitting mechanical energy to the water as the shaft rotates in a desired manner; and said means for flowing includes impeller means disposed on a rotatable shaft carried by the said tubular flow conducting means and operably disposed in communication with the vortex to move the attracted oily film substance and water substantially radially from the tubular flow conductor.

22. An apparatus according to claim 11 wherein said receiver means comprises:

a plate means and a wall means forming said quiescent zone for receiving the attracted oily film substance and water.

23. An apparatus according to claim 11 wherein said receiver means comprises:

a substantially horizontal plate means with a downwardly extending wall means surrounding said plate portion for receiving the attracted oily film substance and water in the quiescent zone formed by said plate and wall means.

24. An apparatus according to claim 11 wherein the receiver means is in direct communication with the water mass to allow the separated water to return to the water mass.

25. A method for recovering an immiscible oily substance spread as an oily film over the surface of a water mass, comprising the steps of:

forming a vortex adjacent the surface of the water mass having an oily film substance disposed on the surface of the water mass with a tubular flow conductor means for attracting both the oily film substance and water in the vicinity of the vortex of flow into the tubular flow conductor means;

flowing all the attracted water and oily film substance radially outward from the tubular flow conductor means into a quiescent zone formed by a receiver means surrounding the tubular flow conductor means and located below the tubular flow conductor means and surface of the water mass and in direct communication with the water mass;

separating the oily film substance and water in the receiver means by allowing the oily film substance to accumulate in the uppermost portion of the receiver means; and recovering the separated oily film substance from the receiver means as desired.

* * * * *